Aug. 17, 1948.                C. ADLER, JR                 2,447,302
                              POSITION LIGHT
Filed Sept. 29, 1947                                    2 Sheets-Sheet 1
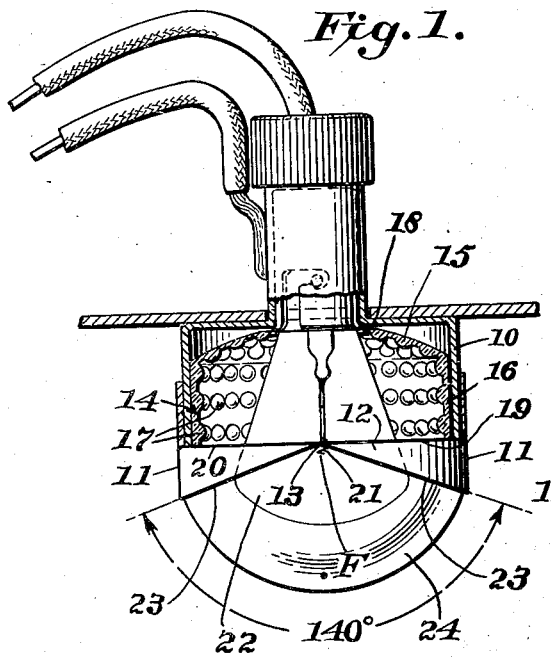
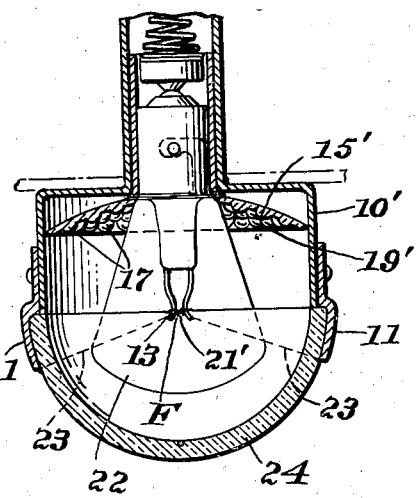
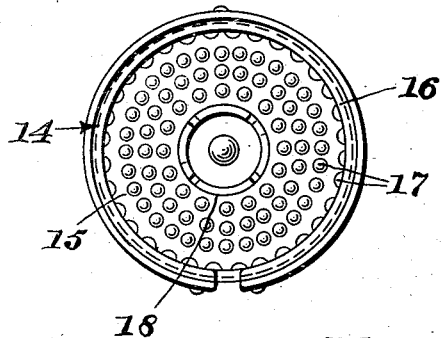
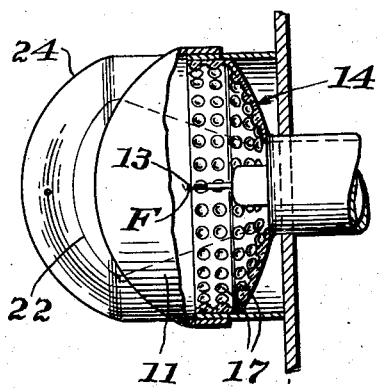
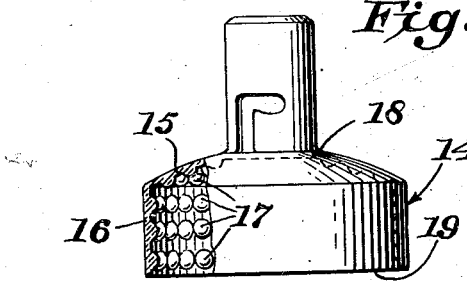
Inventor:
Charles Adler, Jr.,
By Cushman, Darby & Cushman
Attorneys.

Aug. 17, 1948.                C. ADLER, JR                 2,447,302
                              POSITION LIGHT
Filed Sept. 29, 1947                              2 Sheets-Sheet 2
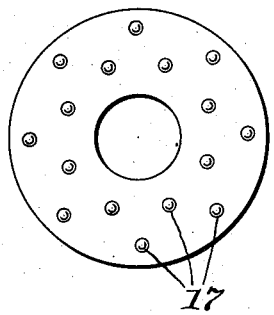
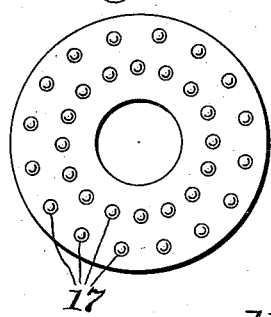
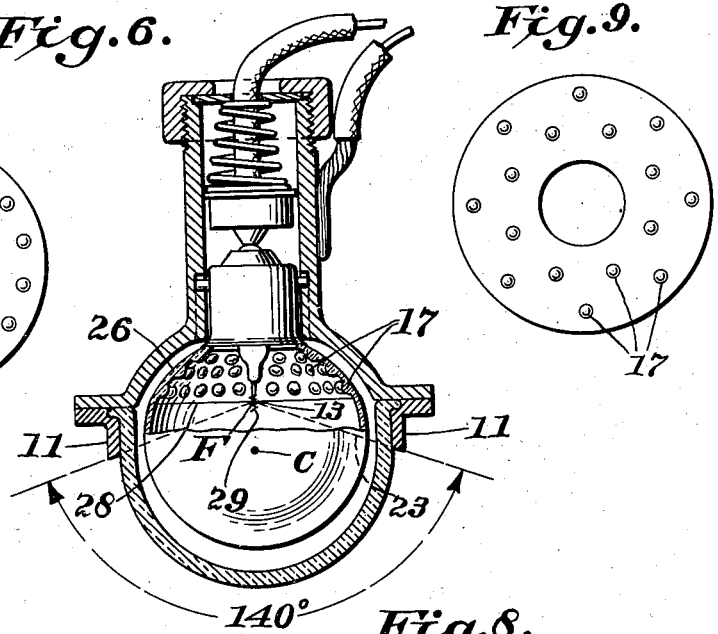
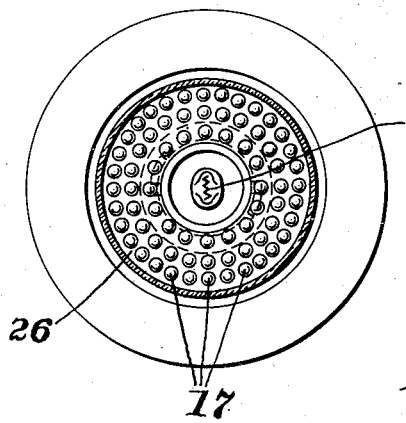
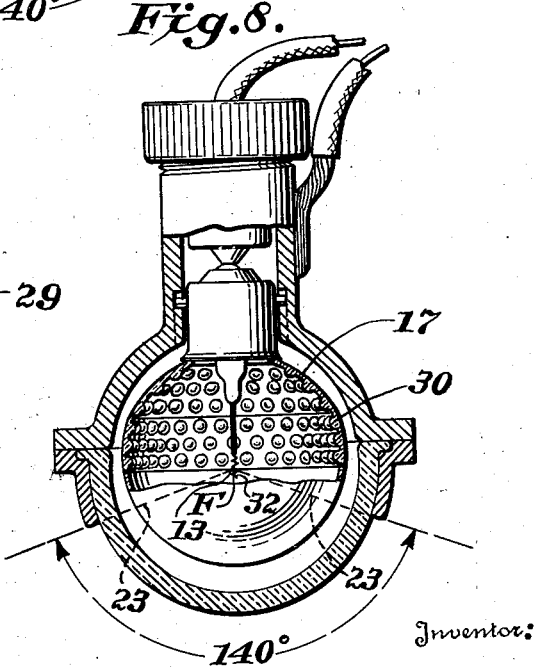
Inventor:
Charles Adler, Jr.,
By Cushman, Darby & Cushman
Attorneys.

Patented Aug. 17, 1948

2,447,302

UNITED STATES PATENT OFFICE 2,447,302

POSITION LIGHT

Charles Adler, Jr., Baltimore, Md.

Application September 29, 1947, Serial No. 776,673

3 Claims. (Cl. 240—7.7)

This invention relates to aircraft position lights, and, more particularly, to an improved tail light. Position lights for aircraft, notably, tail lights, require that a substantial light spread be provided, and that a light of highest possible beam candle power also be made available. The importance of these two requirements increases as the angular relationship between the flight paths of overtaking and preceding aircraft becomes smaller.

It is, therefore, the primary object of this invention to provide a position light which will give not only the horizontal light spread, e. g., 140°, which existing Government regulations require, but will also present an intense light to an overtaking aircraft moving in the zone of greatest danger, namely, close to the flight path of the preceding aircraft.

I have found that the use of an improved reflector system and critical positioning of the electric light source with respect thereto, will produce not only wide angle beams of direct light, but also a multiplicity of wide angle reflected beams, which increase markedly the intensity of the light when viewed within the danger zone, as above explained.

Referring to the drawings,

Figure 1 is a section of my improved position light with parts in plan and viewed from the top, a part of the wall of the housing being cut away;

Figure 2 is a front elevation with the cover glass removed;

Figure 3 is a side elevation partly in section with part of the housing broken away;

Figure 4 is a detail elevational view of the reflector unit;

Figure 5 is a view similar to Figure 1 showing a modification;

Figure 6 is a sectional plan view showing another modification in which the reflecting surface is carried on the electric light bulb;

Figure 7 is a front elevation of the position light shown in Figure 6 with the cover glass removed;

Figure 8 is a view similar to Figure 6 showing a further modification of the construction shown in that figure, and Figures 9 and 10 are elevational face views of preferred forms of reflector surfaces which may be used in connection with Figures 1 to 8.

The preferred form of general construction is illustrated in Figures 1 to 3 and the preferred type of reflector is illustrated in Figure 10. In this construction, the housing 10 is suitably fixed to the aircraft as by means of screws and faring in the usual way. The housing is cylindrical and carries angular light cut-off shields 11 which are detachably or fixedly secured thereto in any suitable manner. Such shields may consist of a single band of metal riveted to the housing 10 about the periphery thereof and having arcuate light shielding portions 12 projecting beyond the housing to provide the opposed light shields, for restricting the horizontal light spread as legally required. The outer arcuate edges of the horizontal light shields meet at diametrically opposed points 13 so that there is no limitation at these points to the vertical light spread. It will be observed that the horizontal light spread is positively limited by the light shields 11 and the increase in vertical light spread is gradual toward the points 13.

I have discovered that when the structure just described is utilized with a concave reflector having a multiplicity of spaced reflecting protuberances, and an electric light source is located at the focal point F of the reflector, improved beam candle power is obtained. Moreover, and at the same time, official requirements with respect to horizontal light spread are fully complied with. The improved construction has been demonstrated successfully and will solve the problems created by the constantly increasing rate of speed of aircraft and the increasing volume of air traffic.

The construction does not require any structural modifications of the aircraft for purposes of installation, and does not depart from the Civil Aeronautics Administration regulations. Moreover, the invention can be utilized with present position light installations and with conventional incandescent lamps having a point source filament and standard light center lengths.

In order to obtain the improved results, a reflector 14 is employed of the concave type, as shown at 15. This reflector may be either spherical or parabolic. The concave reflecting portion 15 may be provided with a substantially cylindrical wall 16, the reflecting or silvered surface of the concave portion 15 and cylindrical portion 16 being continuous. Formed on the continuous reflecting wall 15—16 are a multiplicity of inwardly extending spaced protuberances 17, as shown in Figures 2, 7, 9 and 10. These may be of any desired form, but preferably are in the form of mounds or prisms molded or struck up from the material of which the reflector is made, e. g., glass, metal, plastic, etc. This reflector is suitably united, as by soldering, to a standard bayonet socket, or other lamp socket, as shown at 18, and the reflector and socket constitute a unit which may be built into the original structure or may be introduced to mountings already in position on the aircraft, as shown in Figure 4.

The protuberances 17 may vary in size with relation to the size of the reflector. Preferably, such proportions are employed wherein the protuberances are from $\frac{1}{16}''$ to $\frac{1}{8}''$ in diameter or width at their bases in a reflector having an outside diameter of 2''. The protuberances are preferably spaced apart a distance varying from equal to their diameters or widths to a distance two or more times their diameters or widths as shown in Figure 10, and preferably are arranged in staggered relation as shown. The wide spacing in Figure 9 represents one limit while the close spacing in Figures 2 and 7 represent the opposite limit.

The focal point F of the concave portion 15 of the reflector may be located on the axis of the reflector at varying points, depending on the radius of the reflector, e. g., from a position outside of the marginal edge 19 of the cylindrical wall 16 to a position adjacent a diametric line 20 projected across the marginal edge of the cylindrical wall. In the construction shown in Figure 1, the focal point F of the concave portion 15 coincides with the position of the filament 21 of the incandescent lamp 22.

It will be observed that the arcuate edges 23 of the light shields 11 extend beyond or in advance of the light source 21 whereby to constitute angular light cut-off means for horizontal beams of direct light from the light source 21. That is, the light shields 11 are so disposed as positively to restrict the horizontal light spread of direct beams of light from the filament 21 to 140°. At the present time, the official regulations of the Civil Aeronautics Administration require that the horizontal light spread be limited to 140° and the construction of Figure 1 in actual use has demonstrated complete compliance with these requirements.

The vertical light spread will gradually increase from 140° to 180° due to the merging of the outer edges 23 of the shields 11 to the diametrically opposed points 13, previously mentioned.

A light-transmitting cover glass 24 of any desired color or shape will be employed in the usual manner, and may be of glass, plastic, etc.

From the foregoing, it will be observed that horizontal beams of direct light are cut off or confined to the required angular spread by the shields 11. Moreover, by reason of the concave reflector and the multiplicity of reflecting protuberances, there are produced a great number of reflected beams encompassing a wide angle and their addition to the parallel beams from the concave reflector and the direct beams from the light source markedly increases the beam candle power of the light. In other words, the entire reflecting surface of the reflector is utilized and when viewed by the pilot of an overtaking ship whose flight path is close to that of the preceding aircraft, an intense illumination from the entire reflector surface is presented. At the same time, the light shields 11 confine the horizontal spread within the required limits.

In Figure 5 there is illustrated a modification wherein the cylindrical reflecting wall 16 is omitted and a simple concave reflector 15' of the spherical or parabolic type is employed. In this construction, it will be noted that the focal point F of the reflector extends beyond the marginal edge 19' of the reflector and that the light source 21' coincides with the focal point of the reflector. The filament 21' is disposed, as in the construction in Figure 1, at a point which substantially coincides with a diametric line connecting the outer edge of the housing 10' so that the shields 11 will properly control the horizontal light spread of direct beams, as previously described. Otherwise, the construction is similar to that shown in Figure 1.

Referring to Figure 6, the lamp itself is provided with a concave reflecting surface 26 of the parabolic or spherical type. This surface is suitably silvered and is provided with a multiplicity of spaced reflecting protuberances 17.

The concave reflecting portion 26 and the protuberances are preferably produced by molding the glass of which the lamp is formed. It will be noted in this construction that the focal point of the reflecting surface 26 is located on the axis of such reflector and adjacent a line projected diametrically across the outer edge of the reflector, as shown at 28. The filament 29 coincides with this focal point, and the shields 11 limit the horizontal spread, as required by existing regulations. The shields 11 are similar to those previously described, and the construction and operation of this position light is in accordance with that described in connection with Figures 1 to 5.

Referring to Figures 7 and 8, the concave reflecting surface 26 of the lamp is extended to provide a substantially spherical wall 30 similar to the wall 16 of the construction shown in Figure 1. In other words, the lamp is molded to include a reflecting surface comprising the concave portion 26 and the spherical portion 30 which are suitably silvered and include a multiplicity of spaced reflecting protuberances 17. In this construction the focal point F of the concave portion 26 coincides with the position of the filament 32 adjacent a line projected across the edge at the outer diameter of the cylindrical reflecting wall 30. The shields 11 are positioned and operate in the same manner as described in connection with Figures 1 to 6.

In the preferred construction the shields 11, which restrict the horizontal spread, are preferably not provided with a mirrored or silvered surface.

The effectiveness of the present invention has been demonstrated both from the standpoint of increased beam candle power as well as extreme ease of installation and permanence of assembly, notwithstanding the vibration which is normally encountered in the operation of aircraft.

It will be appreciated from the foregoing description that in any of the forms of the invention, a construction is provided wherein the focal point of the reflector is located at a point from outside of the reflector, as shown in Figure 5, to a point on or adjacent, i. e., close to and within or without a line projecting across the outside diameter of the reflector. The point of the electric light source coincides with this focal point of the reflector. The presence of the protuberances on the reflecting surface which produce a multiplicity of wide angle beams of less spread than the beams of direct light, increase the intensity enormously when the point light source and the focal point of the reflector coincide. Also, it will be noted that the focal point and the point of the light source coincide with a point on a diametric line projected so as to connect the opposed merger points or meeting ends 13 of the ircuate edges 23 of the shields 11. By reason of the construction shown and described, the required angular cut can be positively controlled.

Any suitable type of light transmitting cover 24 may be used.

Referring to Figures 2 and 7 where the protuberances are closely arranged, there is produced wide angle reflected beams extending in a multiplicity of directions with a reduction in the number of parallel beams reflected from the concave type reflector. The reflector of Figure 9 produces narrower beams with less spread because there are fewer protuberances to direct the light into wider angles but there is an increase in the number of parallel beams from the concave reflector. The structure of Figure 10, which is preferred, is intermediate in its effect between the reflectors of Figures 2 and 7, on the one hand, and the reflector of Figure 9, on the other hand.

It is to be understood that the forms of the invention shown and described are merely illustrative of a preferred embodiment and that such changes may be made without departing from the spirit of the invention and the scope of the claims, as fall within the purview of one skilled in the art.

I claim:

1. An aircraft position light comprising an electric light source, a concave reflector, said reflector having a multiplicity of spaced inwardly extending reflecting protuberances, angular cut-off means for limiting the horizontal spread of beams from said light source and reflector, and a light transmitting cover, the focal point of said reflector coinciding with the point of said light source and being located between a point outside of the reflector to a point adjacent a line projected across the outer diameter of the reflector, said cut-off means comprising a pair of shields having arcuate edges whose ends meet at diametric points; the focal point of said reflector and the point of said light source substantially coinciding with a point on a diametric line connecting the meeting ends of the arcuate edges of said shields.

2. An aircraft position light according to claim 1 wherein said concave reflector and said protuberances produce a multiplicity of wide angle beams of less spread than the beams of direct light from said light source.

3. An aircraft position light according to claim 1 wherein the reflecting surface and protuberances are carried by the bulb enclosing said light source.

CHARLES ADLER, JR.

REFERENCES CITED

The following references are of record in the file of this patent:

UNITED STATES PATENTS

| Number | Name | Date |
|---|---|---|
| 514,739 | Timbrell et al. | Feb. 13, 1894 |
| 1,267,884 | McKeever | May 28, 1918 |
| 1,389,180 | Bennett | Aug. 30, 1921 |
| 1,463,677 | Davis | July 31, 1923 |
| 1,693,453 | McElroy | Nov. 27, 1928 |
| 2,084,999 | Birdseye | June 29, 1937 |

FOREIGN PATENTS

| Number | Country | Date |
|---|---|---|
| 433,948 | Great Britain | 1935 |